SAFETY BUILDING CONSTRUCTION

Original Filed Feb. 5, 1958 3 Sheets-Sheet 1

Edward A. Wiegand
INVENTOR.
BY Clarence A. O'Brien and Harvey B. Jacobson
Attorneys

SAFETY BUILDING CONSTRUCTION

Original Filed Feb. 5, 1958 3 Sheets-Sheet 2

Edward A. Wiegand
INVENTOR.

BY Clarence A. O'Brien and Harvey B. Jacobson
Attorneys

SAFETY BUILDING CONSTRUCTION
Original Filed Feb. 5, 1958 3 Sheets-Sheet 3
Fig. 5
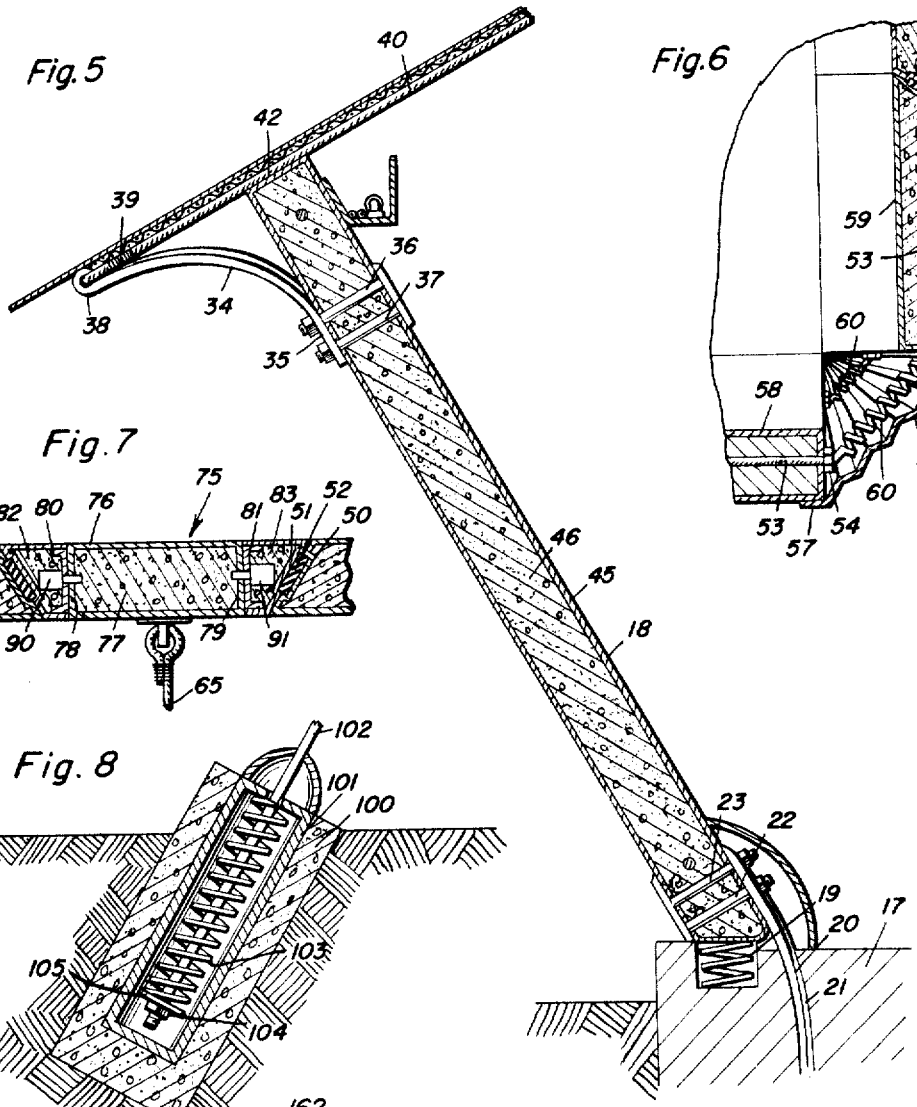
Fig. 6
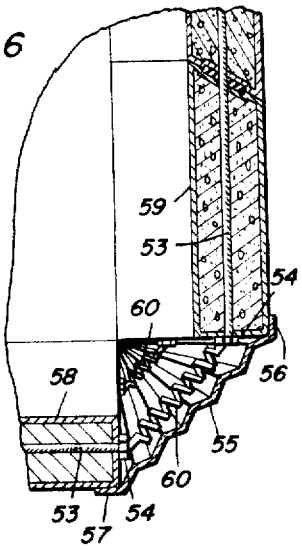
Fig. 7
Fig. 8
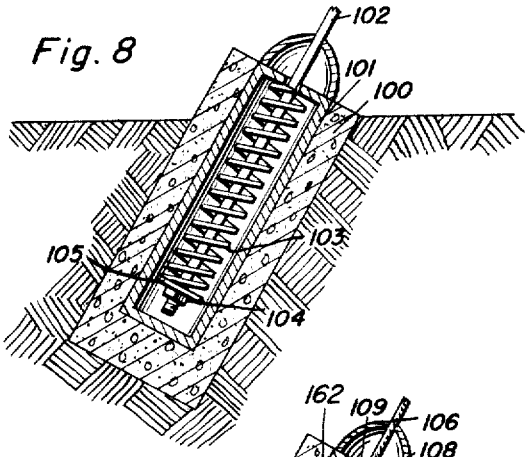
Fig. 9
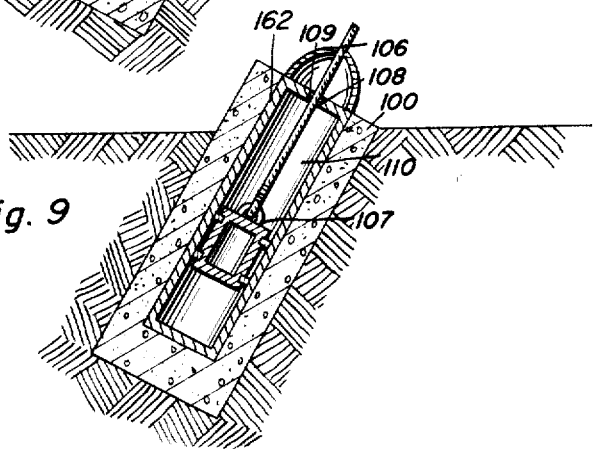
Edward A. Wiegand
INVENTOR.
BY Clarence A. O'Brien and Harvey B. Jacobson
Attorneys United States Patent Office Re. 26,121
Reissued Dec. 6, 1966

26,121
SAFETY BUILDING CONSTRUCTION

Edward A. Wiegand, 18615 Detroit Ave., Lakewood, Ohio

Original No. 3,034,606, dated May 15, 1962, Ser. No. 713,483, Feb. 5, 1958. Application for reissue July 13, 1962, Ser. No. 210,613
32 Claims. (Cl. 169—5)

Matter enclosed in heavy brackets [ ] appears in the original patent but forms no part of this reissue specification; matter printed in italics indicates the additions made by reissue.

This invention relates generally to building constructions and pertains more particularly to a novel type of building construction incorporating means for resisting destruction from sudden shocks and the like and also incorporating means for minimizing injury to the occupants of the building should the latter be destroyed.

When disasters occur, due to natural or other causes, many injuries and deaths may be directly attributed to damage caused by the debris occasioned by the collapse of buildings. Frequently, wall sections may collapse and crush the occupants of a building therebeneath and frequently large masses of the roof and ceiling structures fall upon the occupants of building. Consequently, it is a general objective of this invention to first, provide a building construction having the component parts thereof so related to each other that the building will withstand a great amount of abuse from natural or man made disasters without collapsing, and secondly, to provide in such a building construction means whereby the building if it does collapse wholly or in part, will not likely severely injure the occupants thereof.

More specifically, an object of this invention is to provide an improved building construction employing relatively massive wall constructions constructed and joined together in such a manner as to withstand a substantial amount of relative movement therebetween without causing collapse of the building structure.

Another object of this invention is to provide an improved building construction embodying wall structures which are inclined in upwardly and outwardly disposed positions such that should the wall sections collapse, they will fall outwardly rather than inwardly upon the occupants of the building.

A further object of this invention is to provide an improved building construction of the character described employing a lightweight roof structure which, even though it should collapse, will not be likely to seriously injure the occupants of the building.

A further object of this invention is to provide an improved building construction of the character described incorporating a centrally disposed skeletal framework and a plurality of side wall assemblies forming an enclosure therearound, the side walls being disposed in upwardly and outwardly sloping relationship and with cable assemblies being attached between the upper ends of the side wall assemblies and the skeletal framework serving to support the side walls and also providing support means for a lightweight roof construction.

A further object of this invention is to provide a building construction capable of withstanding great shock loads and including enclosure forming side wall assemblies sloped upwardly and outwardly and joined at the corners of the building by expansible joint elements permitting of wide latitude in movement between adjacent wall sections.

Another object of this invention is to provide a building construction of the character described wherein the wall assemblies therefor are composed of a plurality of vertical panels of wedge shaped configuration in cross-section and so supported that certain of the panels will more readily break away and topple outwardly, away from the occupants of the building.

Still another object of this invention is to provide an improved safety building construction employing a centrally disposed skeletal framework of hollow construction and adapted to contain circulating heating water and which water may also be utilized for fire prevention purposes.

Another object of this invention is to provide a building construction of the character described incorporating wall constructions composed of a plurality of vertically disposed panels which are sloped such as to be tilted outwardly at their upper ends and which panels are so interconnected that certain panels thereof may more easily fall outwardly away from the occupants of the building than the remainder of the wall panels and wherein certain other panels are so constructed as to provide escape doors by means of which the occupants of the building may exit therefrom.

A further object of this invention is to provide an improved building construction of the character described employing at least a pair of vertical poles mounted swivelly at their lower ends upon a suitable base and having guy wires or cables associated with their upper ends to permit a substantial degree of movement of said poles and wherein the poles are provided with enclosing side wall assemblies which are so disposed as to lean outwardly at their upper ends and which are provided with spring like anchor members to which cables are attached to extend therefrom for attachment to a rigid piece extending between the upper ends of the poles, the cables serving to hold the side walls in place and held in tension thereby so as to provide a support structure for an overlying roof which is of light weight construction so that if the same should collapse, serious injury to the occupants of the building is not likely to occur.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an enlarged vertical section taken substantially along the plane of section line 5—5 of FIGURE 1 and illustrating the details of construction and mounting of one of the break away panel assemblies;

FIGURE 6 is an enlarged horizontal section taken substantially along the section line 6—6 in FIGURE 1 illustrating the manner in which the corner portions of the building are connected together;

FIGURE 7 is an enlarged horizontal section taken substantially along the plane of section line 7—7 in FIGURE 1 and showing details of the escape door or hatch mechanism;

FIGURE 8 is an enlarged vertical section taken substantially along the plane of section line 8—8 in FIGURE 1 illustrating the resilient anchor for one of the cable assemblies; and FIGURE 9 is a view similar to FIGURE 8 but showing a type of anchor incorporating a dashpot principle and which is used with the break-away hatch construction.

Figure 1:
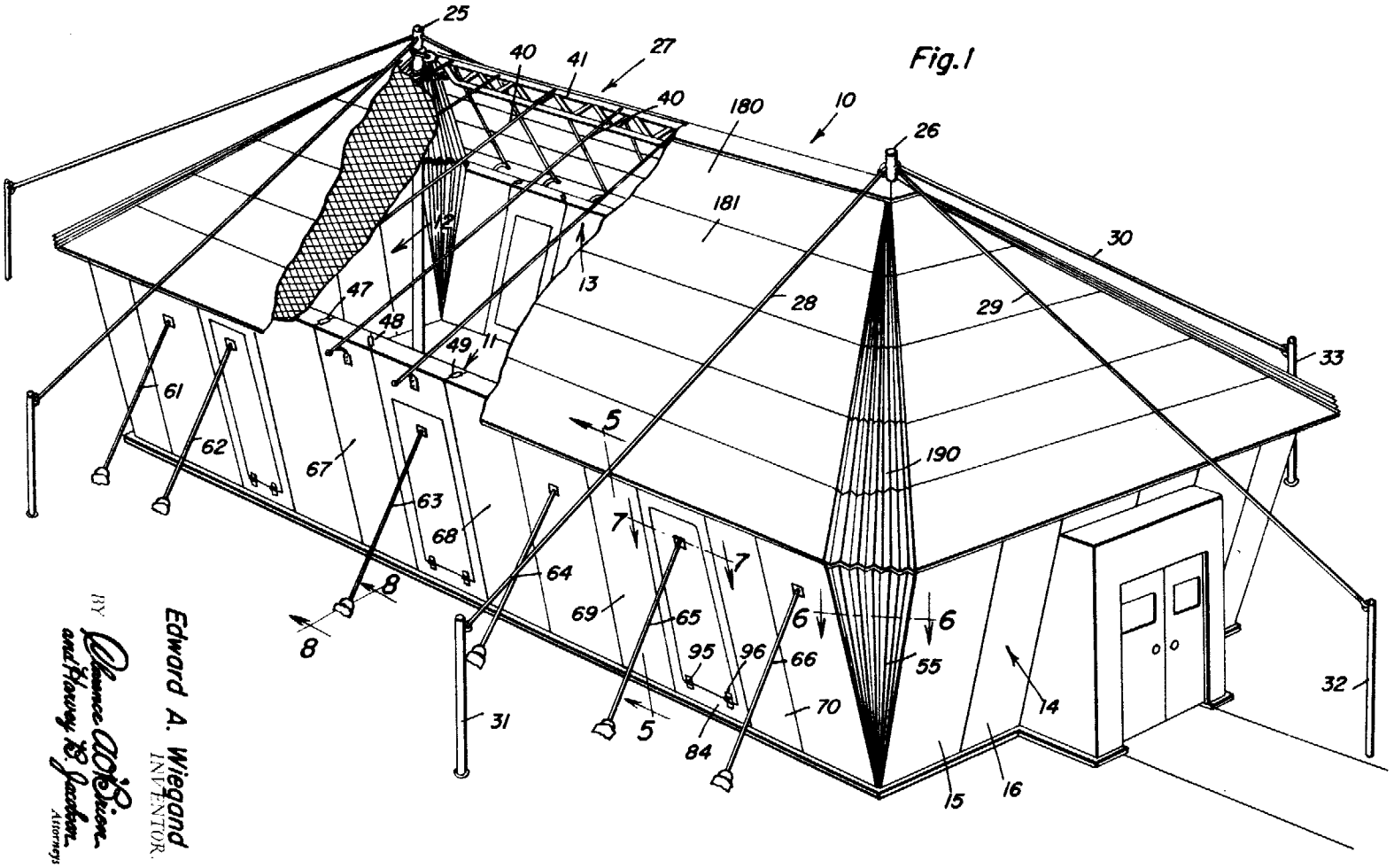
FIGURE 1 is a perspective view partly broken away showing a building constructed in accordance with this invention.

Referring at this time more particularly to FIGURE 1, the reference numeral 10 indicates the building construction in accordance with this invention and which, in the specific construction shown, incorporates the side wall assemblies 11, 12, 13 and 14 which are disposed in generally rectangular relationship to define an enclosure therewithin. Each of the side walls is disposed in generally upwardly and outwardly sloping relationship, as will be readily seen and each is composed of a series of upright panel elements such as those indicated by the reference characters 15 and 16 of the side wall assembly 14.

The lower edges or bases of the side wall panels rest upon a suitable foundation such as is indicated by the reference character 17 in connection with the panel 18 (FIGURE 5). Certain of the side wall panels such as the panels 18, rest upon a coil spring 19, the remainder of the panels being disposed directly upon the foundation 17.

Each of the panels, however, is maintained in place so that its lower end will not kick inwardly by the utilization of one or more leaf spring elements 20 and 21 as is illustrated in FIGURE 5, such leaf spring assembly being embedded directly in the foundation 17 and having its upper end curved outwardly somewhat in the manner shown and fixedly secured to the lower end of the various panels as by fasteners 22 and 23 which preferably extend completely through the panels to serve the purpose of firmly anchoring the same in place. In this manner, the lower ends of each of the vertical panels forming the side walls is at once held against inward movement of the lower end thereof but is permitted a great deal of freedom for flexing or movement such that its upper end swings back and forth. Due to the slope at which the side panels are placed, their natural tendency is to fall outwardly, as will be readily apparent.

In order to hold the upper ends of the various panels in place, a skeletal, centrally disposed support structure is utilized which consists of at least a pair of vertical pole elements *or structural members* 25 and 26 having a ridge piece *or structural member* 27 extending therebetween. As will hereinafter be described, the poles 25 and 26 have their lower ends set so as to permit oscillation of these pole pieces and in order to normally maintain the same in a fixed, predetermined erect position, each of the pole elements is provided with a plurality of guy cables or wires 28, 29 and 30 which are rigidly affixed to the upper ends of the corresponding rods or poles and extend outwardly therefrom to anchor stakes such as those indicated by the reference characters 31, 32 and 33. Preferably, of course, the anchor stakes are widely spaced as is illustrated most clearly in FIGURE 1 so as to impart a maximum of rigidity to the poles.

Each panel is provided with an arched leaf spring element 34 having its lower end position 35 secured as by fasteners 36 and 37 to the outer face of the panel adjacent the upper end thereof, as is clearly illustrated in FIGURE 5. The leaf spring element 34 arches away from the upper end of the panel and terminates in an eye 38. Securely fixed and anchored to each such eye 38 is an end portion 39 of cables 40 which extend therefrom to a point of attachment at their opposite ends to the top chord element 41 of the ridge piece 27. The disposition of each eye 38 is such that the taut cables 40 will rest upon the upper edges 42 of the various panels. It will be appreciated that the cables will support the weight of the panels with which they are associated so as to normally serve to maintain the same in a predetermined vertically inclined position as will be evident from a study of FIGURE 5. FIGURE 5 also illustrates the construction preferred in the case of each of the several panels. This preferred form of construction encompasses the use of an outer casing 45 of metal or the like filled with wood or concrete 46 or some such suitable material, the metal sheathing serving to render the panels as fireproof as is practical and yet it is also to be appreciated that the panels themselves must be sufficiently rigid and of great enough strength as to sustain the necessary loads.

As can be seen in FIGURE 1, the opposite side abutting edges 47, 48, 49, etc. of the panels are cut at a diagonal so that the cross-section of each of the panels is of generally a wedge shape configuration, thus providing an interlocking effect between adjacent panels. It is also preferred, see particularly FIGURE 7, that the vertical side edges of the panels are provided with troughs 50 and 51 receiving an insulation strip 52 therebetween, thus providing an airtight joint between adjacent panels.

FIGURE 6 illustrates the manner in which the entire wall assemblages are held in proper relationship with respect to each other. This is accomplished by providing anchoring cables 53 through at least the corner forming panel elements and which are retained under tension by the shoulder elements 54 secured exteriorly of the cables 53, as is shown. Since all of the panels slope upwardly and outwardly, the corner portions thereof will define openings which are covered by the corrugated or fan shaped strips 55 preferably formed of metal and which are securely anchored at their opposite side edges 56 and 57 to the corresponding corner panels 58 and 59. The cables 53 between the adjacent panels 58 and 59 are permitted to sag or be slack and are encased in the coil springs 60. The purpose of the slack is to permit some movement between adjacent corner panels as will be permitted by the normal expansion of the corrugated metal 55.

Referring back to FIGURE 1, it will be clearly apparent that at least some of the panels are provided with exterior anchoring cable elements 61, 62, 63, 64, 65 and 66 while certain of the other panels will be provided with no such anchoring cables. The panels 67, 68, 69 and 70 which are not provided with anchoring cables have their opposite side edges so sloped or cut as to permit these sections to fall outwardly away from the interior of the building should their anchoring cables 40 break. The remainder of the anchored panel assemblies are provided with escape hatches as will be seen most clearly in FIGURE 7, such hatch being indicated generally by the reference character 75 and, as will be readily apparent, consisting of a generally rectangular outer metal sheathing or case 76 having a suitable filler 77 therein and having its opposite side edges 78 and 79 snugly engaging within the channel elements 80 and 81. The side strips 82 and 83 on opposite sides of the panel 75 and defining the door opening therein carry shear pin elements 90 and 91 which project through the opposite sides 78 and 79 of the door 75 and are adapted, upon shearing, to permit the door to be swung outwardly so as to permit the occupants of the building to escape. In order to control the movement of the door or hatch, the lower edge thereof is provided with suitable hinges 95 and 96 as is seen most clearly in FIGURE 1 so as to permit a controlled swinging outward thereof.

The anchor cables 61–66 are anchored within the ground surface, each of which includes a suitable body of cement 100 or the like having a generally tubular casing 101 or *162* [102] therein. In FIGURE 8, the anchor cable 102, which generally represents the cables 61, 64 and 66, is surrounded, within the casing 101 by a compression spring 103 and is provided at its free end with a nut or similar element 104 bearing against a washer 105 or the like so that tension on the cable 102 will place the spring 103 under compression. This permits a considerable amount of *resilience* [give] yet establishes a substantially rigid assembly. This construction is used in connection with the panels to which the cables 61, 64 and 66 of FIGURE 1 are attached and yieldingly opposes inward movement of the panels in the wall structure.

In FIGURE 9, a dashpot principle is utilized and in this case the cable 106, which generally represents the cables 62, 63 and 65, is provided with a piston element 107 attached to its free end which slides within the bore of the casing 162. In this case, the aperture 108 through which the cable 106 extends at the top of the casing is provided with any suitable packing or sealing material 109 so as to entrap air or fluid within the chamber 110. This, of course, effects a dampening action upon tension forces exerted on the cable 106.

This anchor means is used in connection with the escape hatches 75 to which the cables 62, 63 and 65 of FIGURE 1 are attached.

Figure 2:
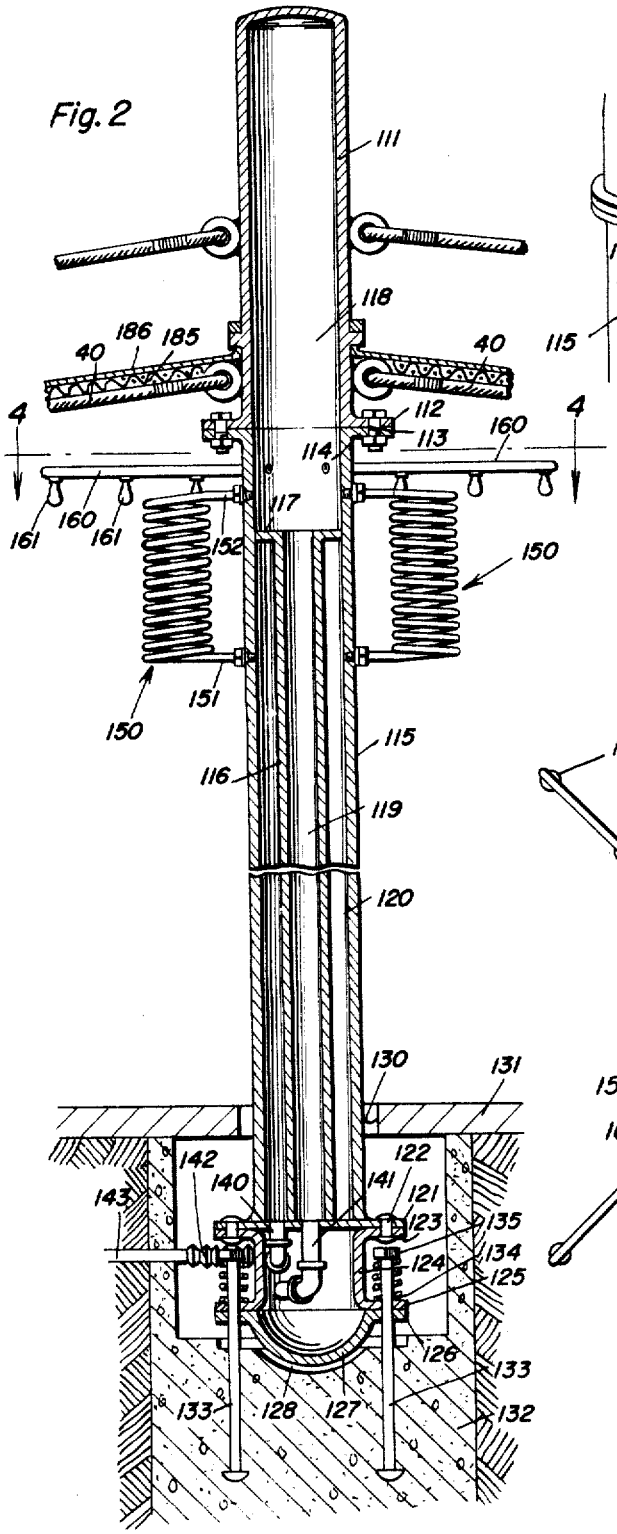
FIGURE 2 is an enlarged vertical section taken through one of the supporting poles for the building structure and illustrating the details of internal construction thereof and the association of the component parts thereof for the purpose of circulating water therethrough.

Referring at this time more particularly to FIGURE 2, the construction and disposition of the poles 25 and 26 will be more clearly seen. In this figure, the reference numeral 111 indicates a hollow cap piece having a mounting flange 112 at its lower end and which is secured as by fasteners 113 to the mounting flange 114 at the upper end of the main body portion 115 of the pole. Disposed within the lower end of the main body portion 115 is a tube element 116 having a collar 117 at its upper end engaging against the inner surface of the main body 115 and serving to isolate the upper chamber 118 and the interior of the tube 119 from the surrounding chamber 120. The lower end of the main body portion 115 is provided with a mounting flange 121 secured as by rivets or the like 122 to the flange 123 of a coupling element 124, also provided with a mounting flange 125 at its lower end mating with mounting flange 126 of the socket element 127 which is of hemispherical configuration, as will be readily apparent, and which seats within a cup shaped bearing element 128 so as to permit the aforementioned oscillation of the pole.

The lower end of the pole projects through an enlarged aperture 130 in the floor 131 of the building and the bearing element 128 is embedded in the foundation 132 as are a plurality of vertically extending rods or bolts 133 which project through the mounting flanges 125 and 126 and provided with compression springs 134 thereon held in position by the nuts 135 at the upper ends of such bolts. This assembly, as will be readily apparent, will yielding permit the oscillation of the pole.

The previously mentioned chamber 120 is provided with an elbow 140 communicating at the lower end thereof and extending outwardly through the side of the coupling element 124 and coupled, through a suitable flexible connection, to a source of water under pressure whereas the interior 119 of the tube 116 is connected through a joint or union 141 which extends through the coupling element 124 and is connected through a suitable flexible element to the other side of the source of water. The flexible line 142 connected to the pipe 143 is that which constitutes the coupling or connection to the element 140.

Interconnecting the chambers 120 and 118 are a series of heating coil elements indicated generally by the reference character 150 and which will be seen to include lower legs 151 connected to and communicating with the interior of the chamber 120 and having upper legs 152 coupled to and communicating with the chamber 118 so that hot water forced upwardly through the chamber 120 will communicate through the heating coils with the chamber 118 and then back down through the tube 116 to the return line 141. As an added measure of safety, the chamber 118 may have provided in connection therewith a series of radially projecting sprinkler arms 160 having suitable nozzles 161 thereon for spraying water into the interior of the building, these nozzles being suitably controlled by fusible metallic elements or the like for automatic operation in the case of fire.

Figure 3:
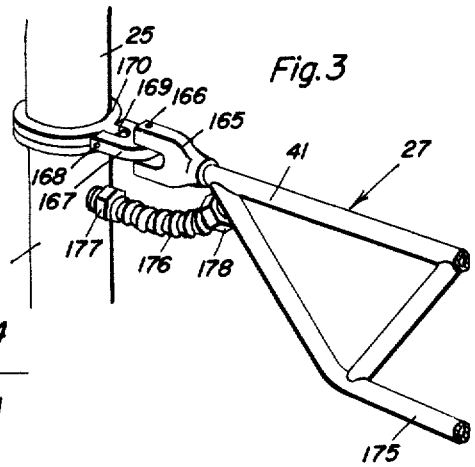
FIGURE 3 is a partial perspective view illustrating the manner in which the ridge piece is connected to one of the supporting poles and serving also to illustrate the fluid coupling line extending between these two elements.
Figure 4:
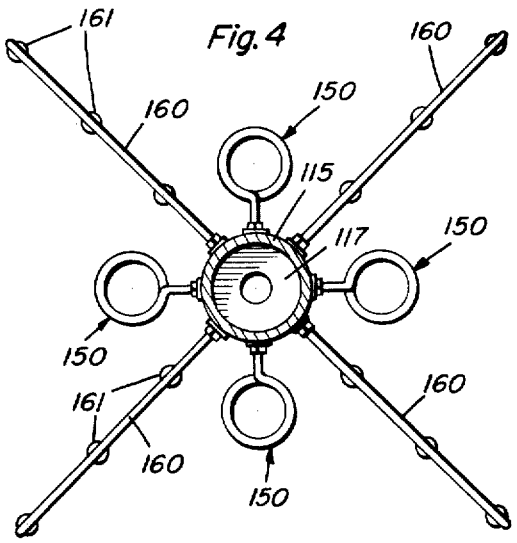
FIGURE 4 is a horizontal section taken substantially along the plane of section line 4—4 in FIGURE 2 and illustrating the disposition of the heating coils and the fire extinguishing nozzle.

FIGURE 3 illustrates the manner in which the ridge piece 27 is connected to the poles 25 and 26. In this figure, it will be evident that the end of the top chord element 41 of the ridge piece is provided with a [crevis] *clevis* element 165 having a swivel pin 166 associated therewith engaging through a second clevis element 167 having a swivel pin 168 associated therewith so as to extend through the ear 169 of a collar 170 affixed to the pole 25. Thus, a universal swivelling action is achieved between the ridge piece and each of the poles 25 and 26. This permits of the aforementioned oscillatory movement of the poles such that the building may sway and rock under the action of external forces to absorb the same without complete collapse or extensive damage to the building.

The top chord 41 of the ridge piece 27 and the bottom chord 175 thereof are of tubular construction and the interiors thereof are intercommunicated so as to distribute the heating water and the fire prevention water therethrough and for this purpose a flexible metallic coupling element 176 is connected by suitable nipples 177 and 178 at its opposite ends to the main body portion 115 of the pole and the bottom chord 175 respectively.

The previously mentioned anchoring cables 40 which serve to support the upper ends of the vertical side panels are anchored to the top chord 41 where appropriate and to the poles 25 and 26 where appropriate also. These various support cables serve not only the purpose of positioning the vertical panels in proper position but also serve as a support for the roof structure which is composed of a plurality of panels 180, 181, etc. as is shown most clearly in FIGURE 1. Each of these roof panels may be comprised of a foraminous undersurface portion 185 see particularly FIGURE 2, and an upper metallic sheathing 186 or other suitable substance but the primary consideration here is that the roof panels be of lightweight and fire resistant construction so that even if the building completely collapses, the roof elements will not seriously injure the occupants of the building. Since the roof is of lightweight construction and serves no purpose in the overall support of the building, the same need not even be self-sustaining and may even be permitted to sag between adjacent cables 40. The corner portions of [acting as lightning rods as well as providing their supangular] *the roof assembly are connected by corrugated triangular* metal strips 190 which are similar in construction to and joined with the triangular corrugated metal strips 55 at the corners of the side walls.

It is to be noted that the hollow columns are capable of acting as lightning rods as well as providing their supporting function and are aptly suitable for the purpose of heating and cooling the building as well as for providing water outlets for the purpose of fire fighting. In addition, the hollow columns will resist the effects of overheating thereof should a fire occur in the building so as to prevent collapse of the main structure of the building.

It is to be understood that in addition to the cables for supporting the roof, the same could be made of light mesh, steel bending materials or the like. Also, the walls could be made of aggregates or other [solids] *solid* materials, as desired. The walls overbalance the weight of the roof and keep the shape of the building while the break-away doors relieve the vacuum of a tornado.

Although the two resilient anchor constructions shown in FIGURES 8 and 9 are modified structures of resilient anchors, they are not alternatives but are used in different manners in the wall assembly. Thus, the anchor construction of FIGURE 8 provides a constant resilient force tending to urge the wall panels outwardly of the building so that in the event of excessive pressure being developed within the interior of the building these panels will pull away and thus vent the excess pressure and also further prevent the relatively massive wall construction from falling inwardly upon the occupants of the building. The resistance of this anchor means is therefore constant regardless of the force applied to the building wall or the rate of movement of the building wall.

On the other hand, the dashpot construction of FIGURE 9 is connected only to the escape hatch or break-away hatch construction of the hatch members 75. The action of the dashpots and the associated cables 62, 63 and 65 represented generally by the cable 106 to provide a relatively slow rate of yield to inward movement of the panel containing the break-away hatch member therein. Thus, the break-away hatch member can remain seated in its associated panel for relatively slight movements of the wall structure. However, if there is a sudden movement of the wall structure such as would be occasioned by an explosion or the like, the sudden inward movement of the wall would be resisted by the dashpot and this in turn would pull or disengage the associated break-away hatch member from its associated panel. Thus there would be a sudden or snapping action to quickly remove the break-away hatches from their associated paths and thus provide a ready means of escape for the occupants of the building.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety building construction comprising a foundation, a plurality of side wall assemblies disposed on said foundation and defining an enclosure, each side wall assembly including a series of elongate panels having their lower end resting upon said foundation and extending therefrom in upwardly and outwardly inclined relation, a plurality of spring leaves embedded in said foundation inwardly of said panels and engaging the lower ends thereof, a pair of vertical poles fixed within said enclosure and having a ridge piece extending therebetween, a plurality of support cables extending between said ridge piece and the upper ends of said panels for holding the panels in predetermined position, and a lightweight roof structure supported on said cables.

2. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, said ridge piece being of elongate tubular construction and including means at the opposite ends thereof swivelly connecting the same to the poles, a plurality of support cables extending between said ridge piece and the upper ends of said panels for holding the panels in predetermined position, and a lightweight roof structure supported on said cables.

3. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation whereby said side walls define V-shaped openings at the intersections thereof, a V-shaped expandable metallic member covering each of said openings and secured to corresponding panels along the opposite sides thereof, a plurality of spring leaves embedded in said foundation inwardly of said panels and engaging the lower ends thereof, a pair of poles fixed within said enclosure and having a ridge piece extending therebetween, a plurality of support cables extending between said rigid piece and the upper ends of said panels for holding the panels in predetermined position, and a lightweight roof structure supported on said cables.

4. A safety building construction comprising a foundation, a plurality of side wall assemblies disposed on said foundation, and defining an enclosure, each side wall assembly including a series of interlocking elongate panels having their lower ends resting upon said foundation and extending therefrom in upwardly and outwardly inclined relation, a plurality of spring leaves embedded in said foundation inwardly of said panels and engaging the lower ends thereof, a pair of upright poles fixed within said enclosure and having a ridge piece extending therebetween, a plurality of roof supporting cables secured to said ridge piece and the upper portions of said panels, and a plurality of guy cables fixed to the upper end of each pole and extending radially downwardly therefrom for attachment to anchor parts exteriorly of said enclosure.

5. A safety building construction comprising a foundation, a plurality of side wall assemblies disposed on said foundation and defining an enclosure, each side wall assembly including a series of edge adjoining elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween and articulatedly connected thereto, a plurality of support cables extending between said ridge piece and the upper ends of said panels for holding the panels in predetermined position, a lightweight roof structure supported on said cables, further spring means carried by the foundation, and one of said side wall assemblies disposed on said further spring means.

6. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of upright poles fixed within said enclosure and having a ridge piece extending therebetween, a plurality of support cables extending between said ridge piece and the upper ends of said panels for holding the panels in predetermined position, and a roof structure supported on said cables.

7. The safety building construction of claim 6, wherein two of said side wall assemblies have adjacent corner edges spaced from each other at the upper ends thereof, strips attached to the last mentioned edges and being extensible and retractible, and a spring and cable assembly mechanically connected to said edges and bridging said space between said edges of said pair of wall assemblies.

8. The safety building construction of claim 6 wherein there are resilient ground anchors, cables extending from some of said side wall assemblies and secured to said resilient ground anchors, knockout doors connected with said side wall assemblies, and means including dashpots for restraining the movement of said knockout doors.

9. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, said ridge piece being of elongate tubular construction and including means at the opposite ends thereof swivelly connecting the same to said poles, a plurality of guy cables fixed to the upper end of each pole and extending radially downwardly therefrom for attachment to anchor parts exteriorly of said enclosure, a plurality of support cables extending between said ridge piece and the upper ends of said panels for holding the panels in predetermined position, and a lightweight roof structure supported on said cables.

10. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, a plurality of support cables extending between said ridge piece and the upper ends of said panels for holding the panels in predetermined position, and a lightweight roof structure supported on said cables, the opposite side edges of said panels being bevelled whereby each panel is of wedge shaped cross-section, and insulating means interposed between the abutting side edges of adjacent panels.

11. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, a plurality of support cables extending between said ridge piece and the upper ends of said panels for holding the panels in predetermined position, and a lightweight roof structure supported on said cables, the opposite side edges of said panels being bevelled whereby each panel is of wedge shaped cross-section, and insulating means interposed between the abutting side edges of adjacent panels, and there being exterior anchor cables attached to certain of said panels limiting inward deflection thereof.

12. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, a plurality of support cables extending between said ridge piece and the upper ends of said panels for holding the panels in predetermined position, and a lightweight roof structure supported on said cables, the opposite end edges of said panels being bevelled whereby each panel is of wedge shaped cross-section and insulating means interposed between the abutting side edges of adjacent panels, certain of said panels having escape openings therein, and a door mounted in each of said openings and hinged at its bottom for outward swinging movement.

13. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, a plurality of support cables extending between said ridge piece and the upper ends of said panels for holding the panels in predetermined position, and a lightweight roof structure supported on said cables, the opposite side edges of said panels being bevelled whereby each panel is of wedge shaped cross-section, and insulating means interposed between the abutting side edges of adjacent panels, and there being exterior anchor cables attached to certain of said panels limiting inward deflection thereof, said anchor cables being resiliently anchored to absorb shock.

14. A safety building construction comprising a foundation, a plurality of side wall assemblies disposed on said foundation and defining an enclosure, each side wall assembly including a series of elongate panels having their lower ends resting upon said foundation and extending therefrom in upwardly and outwardly inclined relation, a plurality of spring leaves embedded in said foundation inwardly of said panels and engaging the lower ends thereof, a pair of poles fixed within said enclosure and having a ridge piece extending therebetween, a plurality of support cables extending between said ridge piece and the upper ends of said panels for holding the panels in predetermined position, and a lightweight roof structure supported on said cables, a spring leaf fixed to the upper end of each of said panels, and said support cables being fixed to the last mentioned spring leaves permitting said panels to absorb shock loads.

15. A safety building construction comprising a foundation, a plurality of side wall panels each supported upon said foundation in outwardly inclined relation and forming part of a side wall enclosure, a plurality of leaf springs having angulated ends, said leaf springs being disposed inwardly of said panels with one end anchored to said foundation and its other end fastened to an associated panel, a roof and roof support means including cables engaging the upper ends of said panels and resisting outward swinging of said panels on said foundation.

16. The combination of claim 15 including a pair of upstanding poles in said enclosure, said roof support means including a rigid ridge piece with said cables being attached thereto, means pivotally mounting the opposite ends of said ridge piece upon said poles.

17. The combination of claim 16 including fluid circulating passage means in at least one of said poles and in said ridge piece, means for circulating a fluid in heat exchange relation through said passage means.

18. The combination of claim 17 including socket means swivelly receiving and supporting the lower ends of said poles, said fluid circulating means extending through said socket means into its associated pole.

*19. In combination a structural member for buildings and the like, liquid circulating passage means in said structural member and forming at least a portion of a closed loop liquid circulatory system, a liquid in said passage means and system, and means circulating said liquid through said passage means and system.*

*20. The combination according to claim 19 with sprinkler means in communication with said passage means releasing said liquid from said passage means at a predetermined temperature.*

*21. A building construction comprising a plurality of structural members, liquid circulating passage means in said structural members and forming at least a portion of a closed loop liquid circulatory system, a liquid in said*

*passage means and system, and means circulating said liquid through said passage means in heat exchange relationship with the interior of the building.*

*22. The building construction according to claim 21 with sprinkler means in communication with said passage means, said sprinkler means including means releasing said liquid in said passage means through said sprinkler means at a predetermined temperature.*

*23. A building construction comprising at least one vertical structural member and at least one horizontal structural member pivotally mounted on said one vertical structural member, liquid circulating passage means in said vertical and horizontal structural members, and means for circulating a liquid through said passage means in heat exchange relationship with the interior of the building.*

*24. A hollow structural member for a building and the like and means to control the temperature about the structural member and to protect the structural member against fire and overheating comprising a liquid disposed in said structural member in heat exchange relationship with the exterior of said structural member, and means to circulate said liquid at a predetermined temperature through said structural member.*

*25. The building construction according to claim 24 in which said liquid is water.*

*26. A heat-resistant structural frame comprising hollow liquid tight interconnected structural elements providing the frame and each having a cavity extending the length thereof with the cavities of connected elements being in communication and providing a continuous, closed loop circuit for liquid through the frame, and means maintaining said circuit filled with a heat absorbing liquid at all times.*

*27. The structural frame according to claim 26 with means interconnected with said circuit for automatically discharging said liquid from said circuit onto a fire adjacent thereto.*

*28. The method of protecting building structural members against damage due to fire and overheating and of controlling the temperature of the interior of the building of which the structural members are a part comprising providing the structural member with liquid passage means, and circulating a liquid, at predetermined temperature, through said passage means and in heat exchange relationship with the interior of the building.*

*29. The method according to claim 28 in which said liquid is water.*

*30. A temperature regulating and heat-resistant frame for buildings comprising interengaging vertical and horizontal structural members having interconnected liquid circulating passage means therein, a liquid of predetermined temperature filling said passage means at all times, and means to circulate said liquid in said passage means.*

*31. A heat-resistant frame for a building comprising vertical columns, a horizontal girder connecting said columns and girder having internal cavities extending the length thereof in complete free communication one with the other entirely within said columns and girder, a heat absorbing liquid filling said cavities at all times and means for supplying said liquid under pressure to said cavities, connected to the lowermost end of at least one of said columns and extending under the supporting surface for said columns for being protected from heat thereabove.*

*32. A heat-resistant frame for a building comprising vertical columns, a horizontal girder connecting said columns, said columns and girder having internal cavities extending the length thereof and in communication one with the other, a heat absorbing liquid filling said cavities at all times, and means for supplying said liquid under pressure to said cavities connected to the lowermost end of at least one of said columns and extending under the supporting surface for said columns.*

References Cited by the Examiner

The following references, cited by the Examiner, are of record in the patented file of this patent or the original patent.

UNITED STATES PATENTS

| | | | |
|---|---|---|---|
| 175,741 | 4/1876 | Parker | 52–168 |
| 273,556 | 3/1883 | Liddle | 52–168 |
| 364,077 | 5/1887 | Adis | 52–146 |
| 583,293 | 5/1897 | Pomeroy | 52–220 |
| 715,603 | 12/1902 | Quarrie et al. | 52–4 X |
| 874,939 | 12/1907 | Clayton et al. | 52–262 |
| 1,357,407 | 11/1920 | Lang | 49–199 |
| 2,376,728 | 5/1945 | Shaer | 52–455 |
| 2,511,974 | 6/1950 | Finken et al. | 52–83 X |
| 2,616,529 | 11/1952 | MacDonald | 98—31 |
| 2,734,583 | 2/1956 | Milan | 169–5 |
| 2,809,074 | 10/1957 | MacDonald | 52—694 X |
| 2,853,745 | 9/1958 | Gipslis | 52—617 |
| 2,871,997 | 2/1959 | Simpson et al. | 52–93 |
| 3,050,134 | 8/1962 | Multin | 52–220 X |

FOREIGN PATENTS

| | | |
|---|---|---|
| 984,639 | 2/1951 | France. |
| 709,239 | 5/1954 | Great Britain. |

RICHARD W. COOKE, JR. *Primary Examiner.*

JOEL REZNEK, JACOB L. NACKENOFF, *Examiners.*

W. L. SHEDD, *Assistant Examiner.*